US011954866B2

United States Patent
Naganuma et al.

(10) Patent No.: US 11,954,866 B2
(45) Date of Patent: Apr. 9, 2024

(54) IMAGE PROCESSING APPARATUS USING MOVEMENT ESTIMATION, IMAGING APPARATUS, SYSTEM, IMAGE PROCESSING METHOD, AND PROGRAM

(71) Applicant: Sony Interactive Entertainment Inc., Tokyo (JP)

(72) Inventors: Hiromasa Naganuma, Tokyo (JP); Masakazu Hayashi, Tokyo (JP); Yosuke Kurihara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 178 days.

(21) Appl. No.: 17/634,300

(22) PCT Filed: Aug. 20, 2019

(86) PCT No.: PCT/JP2019/032342
§ 371 (c)(1),
(2) Date: Feb. 10, 2022

(87) PCT Pub. No.: WO2021/033250
PCT Pub. Date: Feb. 25, 2021

(65) Prior Publication Data
US 2022/0284593 A1 Sep. 8, 2022

(51) Int. Cl.
*G06T 7/20* (2017.01)
*G06T 5/20* (2006.01)
(Continued)

(52) U.S. Cl.
CPC ............... *G06T 7/20* (2013.01); *G06T 5/20* (2013.01); *G06T 5/73* (2024.01); *H04N 5/06* (2013.01); *H04N 23/45* (2023.01)

(58) Field of Classification Search
CPC .. G06T 7/20; G06T 5/003; G06T 5/20; G06T 5/50; G06T 2207/10016;
(Continued)

(56) References Cited

U.S. PATENT DOCUMENTS 9,389,693 B2 7/2016 Lee
9,986,179 B2 5/2018 Govil
(Continued)

FOREIGN PATENT DOCUMENTS

CN 107079115 A 8/2017
CN 108074222 A 5/2018
(Continued)

OTHER PUBLICATIONS

International Search Report for corresponding PCT Application No. PCT/JP2019/032342, 2 pages, dated Nov. 5, 2019.
(Continued)

*Primary Examiner* — Hung H Lam
(74) *Attorney, Agent, or Firm* — Matthew B. Dernier, Esq.

(57) ABSTRACT

An image processing apparatus includes a movement estimation unit that estimates, on the basis of a first timestamp provided to an image captured by synchronous scanning, an event signal generated corresponding to an intensity change of light at one or a plurality of pixels of the image, and a second timestamp that is provided to the event signal and is in synchronism with the first timestamp, a movement of an imaging target in the image, an inverse filter generation unit that generates an inverse filter on the basis of the movement, and a filter application unit that applies the inverse filter to the image.

8 Claims, 6 Drawing Sheets

(51) Int. Cl.
  *G06T 5/73* (2024.01)
  *H04N 5/06* (2006.01)
  *H04N 23/45* (2023.01)
(58) Field of Classification Search
  CPC .......... G06T 2207/10024; G06T 2207/20201;
       H04N 5/06; H04N 23/45; H04N 5/144;
       H04N 2201/3215; H04N 1/00167; H04N
       1/00172; H04N 1/32106; H04N 17/002;
       H04N 23/681; H04N 23/6812; H04N
       23/684; H04N 23/71; H04N 23/90; H04N
       5/77; H04N 5/9201; H04N 21/8547
  See application file for complete search history.

(56) References Cited

U.S. PATENT DOCUMENTS

| | | | |
|---|---|---|---|
| 11,122,224 B2 | 9/2021 | Suh | |
| 2014/0320403 A1 | 10/2014 | Lee | |
| 2016/0094796 A1 | 3/2016 | Govil | |
| 2016/0316110 A1* | 10/2016 | Ross | H04N 23/73 |
| 2017/0213324 A1* | 7/2017 | Wang | G06T 5/50 |
| 2018/0009082 A1 | 4/2018 | Farrell | |
| 2018/0146149 A1 | 5/2018 | Suh | |
| 2019/0035091 A1* | 1/2019 | Bi | G06T 7/251 |
| 2020/0068123 A1* | 2/2020 | Chen | H04N 23/54 |
| 2023/0154143 A1* | 5/2023 | Taamazyan | G06V 10/14 |
| | | | 382/165 |
| 2023/0169665 A1* | 6/2023 | Taamazyan | G06T 7/292 |
| | | | 382/103 |

FOREIGN PATENT DOCUMENTS

| | | |
|---|---|---|
| JP | 2003209735 A | 7/2003 |
| JP | 2014535098 A | 12/2014 |
| JP | 2017535999 A | 11/2017 |
| JP | 2018085725 A | 5/2018 |
| WO | 2019049763 A1 | 3/2019 |

OTHER PUBLICATIONS

Extended European Search Report for corresponding EP Application No. 19942090.2, 12 pages dated Apr. 6, 2023.
Censi Andrea, et al., "Low-Latency event-based visual odometry" IEEE International Conference on Robotics and Automation, pp. 703-710, dated May 31-Jun. 7, 2014 (for relevancy see non-pat. lit. #1).
Pan Liyuan, et al., "Bringing a Blurry Frame Alive at High Frame-Rate With an Event Camera", 2019 IEEE/CVF Conference on Computer Vision and Pattern Recognition, pp. 6813-6822, dated Jun. 5, 2019 (for relevancy see hon-pat. lit. #1).
Ai Bovik: "Handbook of Image & Video Processing", Academic Press, REFEREX, 2000, XP040425211, pp. 129-136, dated Jul. 21, 2000 (for relevancy see non-pat. lit. #1).
The First Office Action for corresponding CN Application No. 201980099252.5, 13 pages dated Oct. 19, 2023.

* cited by examiner

IMAGE PROCESSING APPARATUS USING MOVEMENT ESTIMATION, IMAGING APPARATUS, SYSTEM, IMAGE PROCESSING METHOD, AND PROGRAM

TECHNICAL FIELD

The present invention relates to an image processing apparatus, an imaging apparatus, a system, an image processing method, and a program.

BACKGROUND ART

An event-driven type vision sensor is known in which pixels that detect an intensity change of incident light generate signals time-asynchronously. The event-driven type vision sensor is advantageous in that it can operate at a high speed with low power consumption in comparison with a frame type vision sensor in which all pixels are scanned in every predetermined cycle, particularly with CCD (Charge-Coupled Device) or CMOS (Complementary Metal-Oxide Semiconductor) image sensors and so forth. A technology related to such an event-driven type vision sensor as just described is disclosed, for example, in PTL 1 and PTL 2.

PATENT LITERATURE

[PTL 1] JP 2014-535098T [PTL 2] JP 2018-85725A

SUMMARY

Technical Problem

However, regarding the event-driven type vision sensor, although such an advantage as described above is known, sufficient proposals have not been made for a utilization method of using the event-driven type vision sensor in combination with another device, for example, a frame type vision sensor.

Therefore, it is an object of the present invention to provide an image processing apparatus, an imaging apparatus, a system, an image processing method, and a program that can achieve advantageous effects by using an event-driven type vision sensor in combination with a frame type vision sensor.

Solution to Problem

According to a certain aspect of the present invention, there is provided an image processing apparatus including a movement estimation unit that estimates, on the basis of a first timestamp provided to an image captured by synchronous scanning, an event signal generated corresponding to an intensity change of light at one or a plurality of pixels of the image, and a second timestamp that is provided to the event signal and is in synchronism with the first timestamp, a movement of an imaging target in the image, an inverse filter generation unit that generates an inverse filter on the basis of the movement, and a filter application unit that applies the inverse filter to the image.

According to another aspect of the present invention, there is provided an imaging apparatus including a first vision sensor that captures an image by synchronous scanning and provides a first timestamp to the image, and a second vision sensor that includes a sensor associated with one or a plurality of pixels of the image, generates, when the sensor detects an intensity change of light, an event signal, and provides a second timestamp synchronized with the first timestamp to the event signal.

According to a further aspect of the present invention, there is provided a system including a first vision sensor that captures an image by synchronous scanning and provides a first timestamp to the image, a second vision sensor that includes a sensor associated with one or a plurality of pixels of the image, generates, when the sensor detects an intensity change of light, an event signal, and provides a second timestamp synchronized with the first timestamp to the event signal, and an image processing apparatus that includes a movement estimation unit that estimates a movement of an imaging target in the image on the basis of the first timestamp, the event signal, and the second timestamp, an inverse filter generation unit that generates an inverse filter on the basis of the movement, and a filter application unit that applies the inverse filter to the image.

According to a still further aspect of the present invention, there is provided an image processing method including a step of capturing an image by synchronous scanning and providing a first timestamp to the image, a step of including a sensor associated with one or a plurality of pixels of the image, generating, when the sensor detects an intensity change of light, an event signal, and providing a second timestamp synchronized with the first timestamp to the event signal, a step of estimating a movement of an imaging target in the image on the basis of the first timestamp, the event signal, and the second timestamp, a step of generating an inverse filter on the basis of the movement, and a step of applying the inverse filter to the image.

According to a yet further aspect of the present invention, there is provided a program for causing a computer to implement a function of estimating, on the basis of a first timestamp provided to an image captured by synchronous scanning, an event signal generated corresponding to an intensity change of light at one or a plurality of pixels of the image, and a second timestamp that is provided to the event signal and is in synchronism with the first timestamp, a movement of an imaging target in the image, a function of generating an inverse filter on the basis of the movement, and a function of applying the inverse filter to the image.

DESCRIPTION OF EMBODIMENT

In the following, an embodiment of the present invention is described with reference to the accompanying drawings. It is to be noted that, in the present specification and the drawings, components having substantially same functional configurations are denoted by like reference signs and overlapping description of them is omitted herein.

Figure 1:
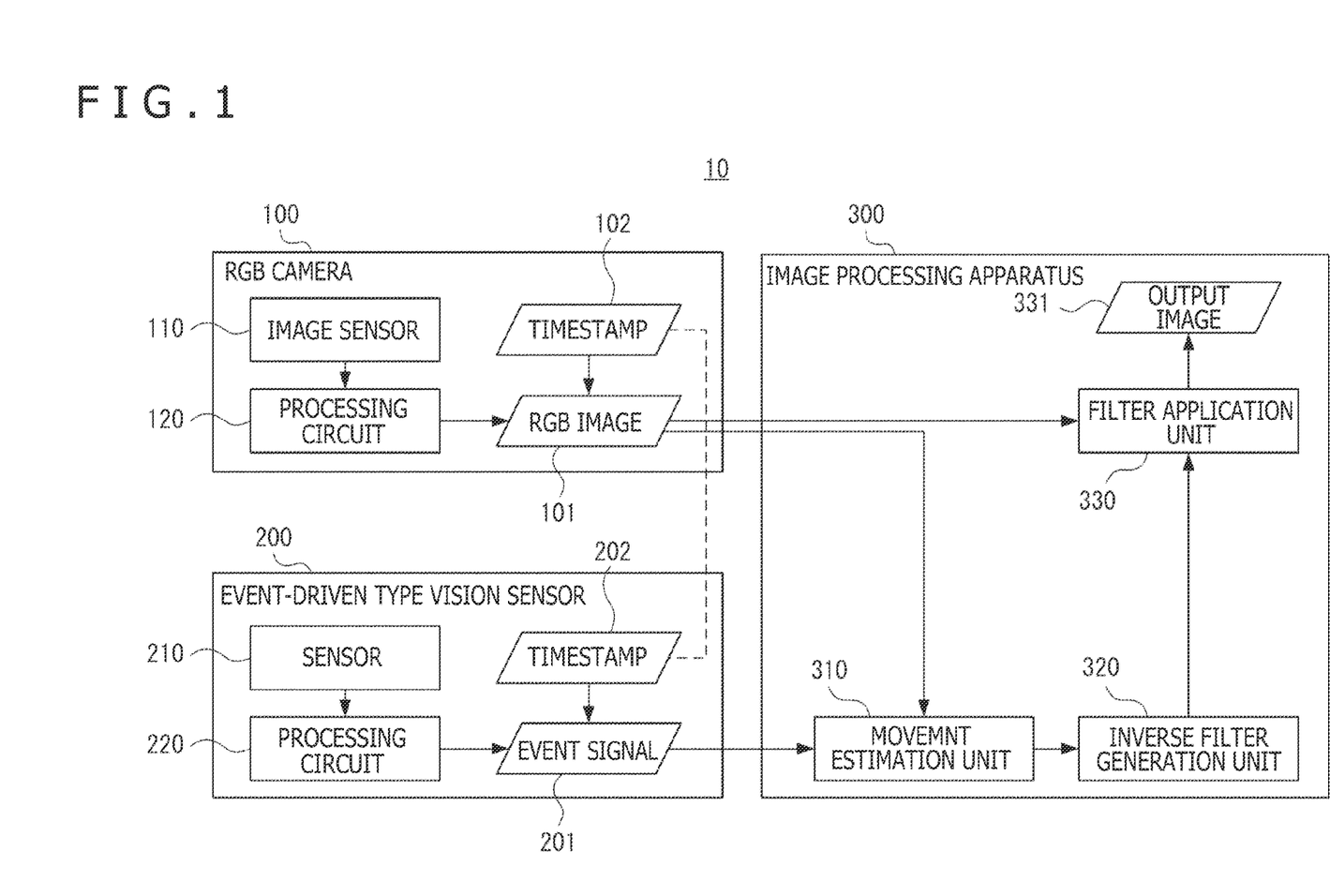
FIG. 1 is a block diagram depicting a general configuration of a system according to an embodiment of the present invention.

FIG. 1 is a block diagram depicting a general configuration of a system according to an embodiment of the present invention. As depicted in FIG. 1, a system 10 includes an RGB (Red-Green-Blue) camera 100, an EDS (Event Driven Sensor) 200, and an image processing apparatus 300.

The RGB camera 100 is an example of a first vision sensor that captures an image by synchronous scanning and includes an image sensor 110 and a processing circuit 120 connected to the image sensor 110. The image sensor 110 captures an RGB image 101 by synchronously scanning all pixels, for example, in a predetermined cycle or at a predetermined timing according to a user operation. The processing circuit 120 converts the RGB image 101 into a format, for example, suitable for storage or transmission. Further, the processing circuit 120 provides a timestamp 102 to the RGB image 101. For example, the processing circuit 120 provides a timestamp 102 indicative of at least any of start or end of scanning by the image sensor 110 to the RGB image 101. For example, in the case of a still image, the period of time from the start to the end of scanning is referred to also as exposure period of time.

The EDS 200 is an example of a second vision sensor that generates an event signal when a sensor detects an intensity change of light and includes sensors 210 configuring a sensor array and a processing circuit 220 connected to the sensors 210. Each of the sensors 210 includes a light reception element and generates an event signal 201 when it detects an intensity change of light incident thereto, more particularly, a luminance change. Since any sensor 210 that does not detect an intensity change of incident light does not generate the event signal 201, in the EDS 200, the event signal 201 is generated time-asynchronously. The event signal 201 outputted through the processing circuit 220 includes identification information of the sensor 210 (for example, the position of a pixel), a polarity (increase or decrease) of a luminance change, and a timestamp 202.

Here, in the present embodiment, the timestamp 102 provided to the RGB image 101 and the timestamp 202 provided to the event signal 201 are in synchronism with each other. In particular, the timestamp 102 can be synchronized with the timestamp 202, for example, by providing time information, which is used to generate the timestamp 202 in the EDS 200, to the RGB camera 100. Alternatively, in a case where the time information for generating the timestamps 102 and 202 is independent between the RGB camera 100 and the EDS 200, by calculating an offset amount between the timestamps with reference to time at which a specific event (for example, a change of an imaging target over an overall image) occurs, the timestamp 102 and the timestamp 202 can be synchronized with each other ex post facto.

Further, in the present embodiment, by a calibration procedure for the RGB camera 100 and the EDS 200 executed in advance, each sensor 210 of the EDS 200 is associated with one or a plurality of pixels of the RGB image 101, and the event signal 201 is generated corresponding to an intensity change of light at one or a plurality of pixels of the RGB image 101.

Figure 2:
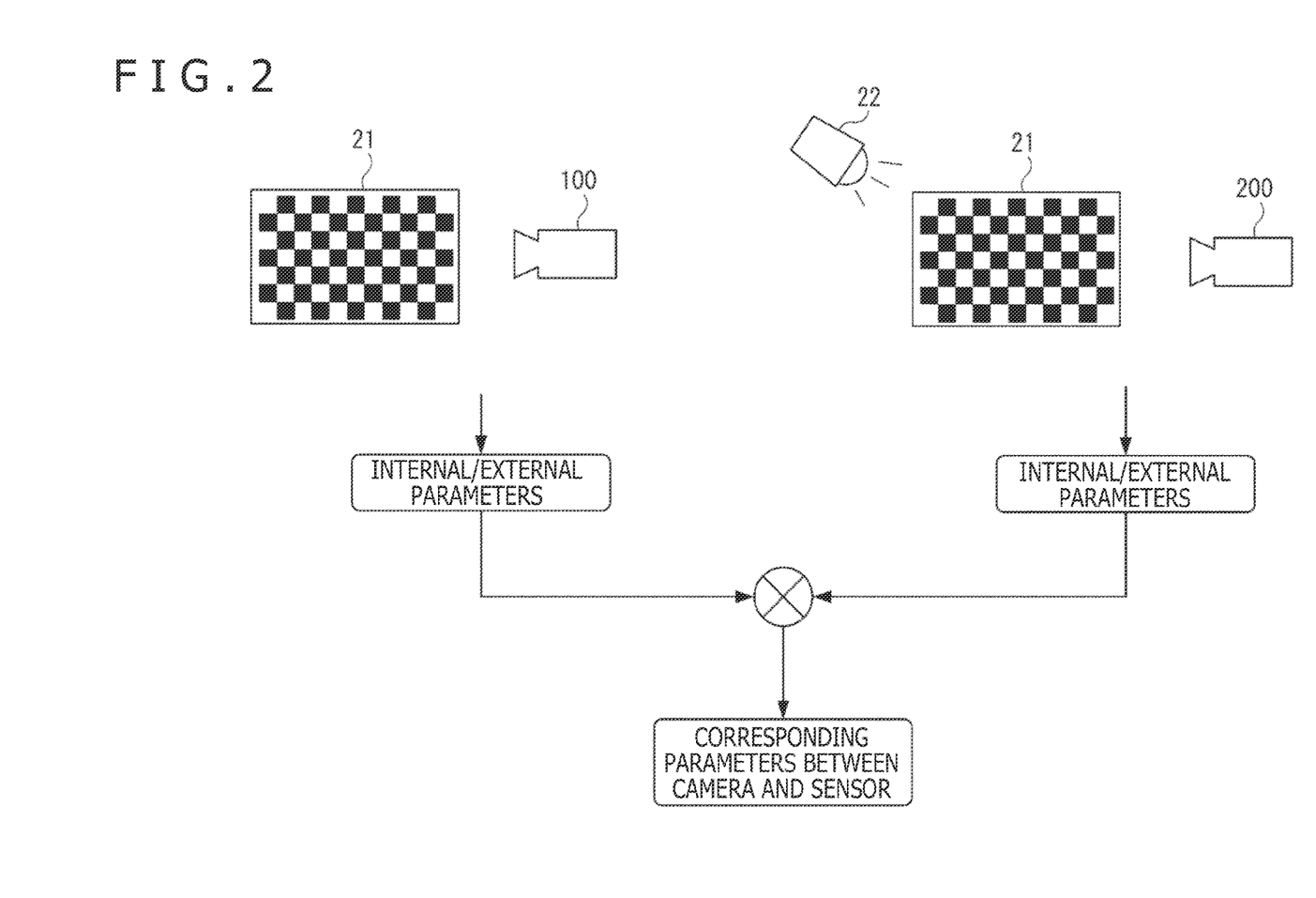
FIG. 2 is a view schematically illustrating calibration between a camera and a sensor in the embodiment of the present invention.

FIG. 2 is a view schematically illustrating calibration between a camera and a sensor in the embodiment of the present invention. In the example depicted, a calibration pattern 21 common to the RGB camera 100 and the EDS 200 is imaged (in the case of the EDS 200, by causing the overall region of the calibration pattern 21 to flicker, for example, using a light source 22, the calibration pattern can be imaged), and corresponding parameters between the camera and the sensor are calculated from internal parameters and external parameters of the RGB camera 100 and the EDS 200. By this, each sensor 210 can be associated with one or a plurality of pixels of the RGB image 101. For example, an imaging apparatus that includes a combination of the RGB camera 100 and the EDS 200 for which such synchronization of timestamps and a calibration procedure as described above are carried out in advance may be provided.

Figure 3:
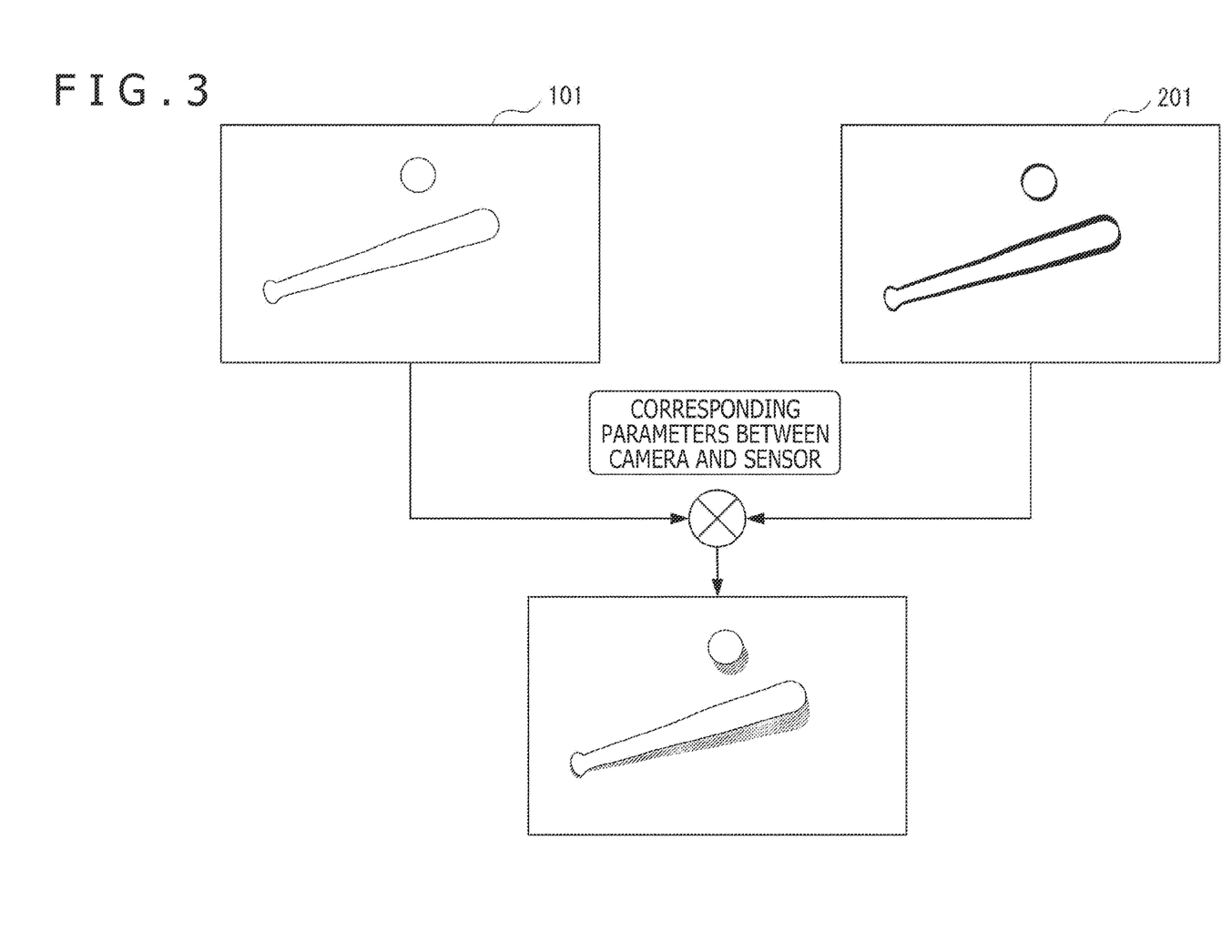
FIG. 3 is a view illustrating an example of matching between an image and an event signal in the embodiment of the present invention.

FIG. 3 is a view illustrating an example of matching between an image and an event signal in the embodiment of the present invention. In the example depicted, an RGB image 101 captured by the RGB camera 100 and an event signal 201 outputted from the EDS 200 at time corresponding to scanning of the RGB image 101 are depicted as arranged at positions of pixels. By calculating such corresponding parameters between the camera and the sensor as described hereinabove with reference to FIG. 2 in advance, it is possible to associate the event signal 201 with one or a plurality of pixels of the RGB image 101 as depicted in FIG. 3, in short, to superpose the event signal 201 on the RGB image 101.

Referring again to FIG. 1, the image processing apparatus 300 includes functions of a movement estimation unit 310, an inverse filter generation unit 320, and a filter application unit 330 that are incorporated by a computer including, for example, a communication interface, a processor, and a memory and are implemented by operation of the processor in accordance with a program stored in the memory or received through the communication interface. In the following, the functions of the components are described further.

The movement estimation unit 310 estimates a movement of an imaging target in the RGB image 101 on the basis of the timestamp 102 provided to the RGB image 101, the event signal 201, and the timestamp 202 provided to the event signal 201. In a case where the imaging target of the RGB image 101 moves, an intensity change of light, particularly a luminance change, which appears at an edge portion of the imaging target, is detected from the event signal 201. In other words, in the present embodiment, even if the movement estimation unit 310 does not refer to the RGB image 101 itself, it can estimate a movement of the imaging target in the RGB image 101 on the basis of the event signal 201. The movement estimation unit 310 can estimate, from a position change in time series of pixels with regard to which occurrence of a luminance change is indicated by the event signal 201, a movement region in which the movement of the imaging target occurs in the RGB image 101 and a movement vector that indicates the movement of the imaging target in the RGB image 101.

In particular, for example, the movement estimation unit 310 estimates a movement on the basis of the event signals 201 having timestamps 202 included within a period of time from the start to the end of scanning for capturing the RGB image 101. Here, the period of time from the start to the end of scanning is specified, for example, from two timestamps provided to the RGB image 101. Alternatively, even in a case where only a timestamp indicative of any of the start or the end of scanning is provided to the RGB image 101, if the duration of the scanning is known already, then the period of time from the start to the end of the scanning can be specified. As hereinafter described, for example, by applying an inverse filter generated on the basis of a movement of an imaging target occurring during a period of time from the start to the end of scanning, the influence of blur appearing in the RGB image 101 by a movement of an imaging target can be reduced.

The inverse filter generation unit 320 generates an inverse filter 321 on the basis of a movement of an imaging target in the RGB image 101 estimated by the movement estimation unit 310. Here, the inverse filter is a filter that intends to bring the RGB image 101 closer to an original image of the imaging target by causing a change (filter) inverse to a change (filter) from an original picture of the imaging target caused in the RGB image 101 by a movement of the imaging target. The filter application unit 330 applies the inverse filter 321 to the RGB image 101 to obtain an output image 331. As hereinafter described, the filter application unit 330 may apply a filter for compensating for a change caused in the RGB image 101 by application of the inverse filter 321 (for example, for filling up a blank region by enlarging the background) separately to the RGB image 101.

Figure 4A:
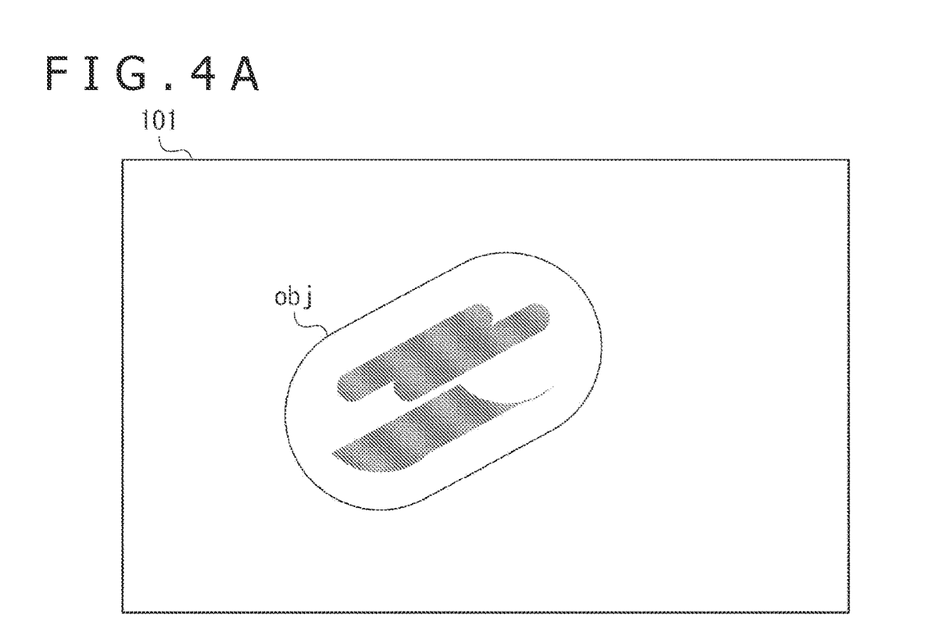
FIG. 4A is a view illustrating estimation of a movement and an inverse filter based on an event signal in the embodiment of the present invention.
Figure 4B:
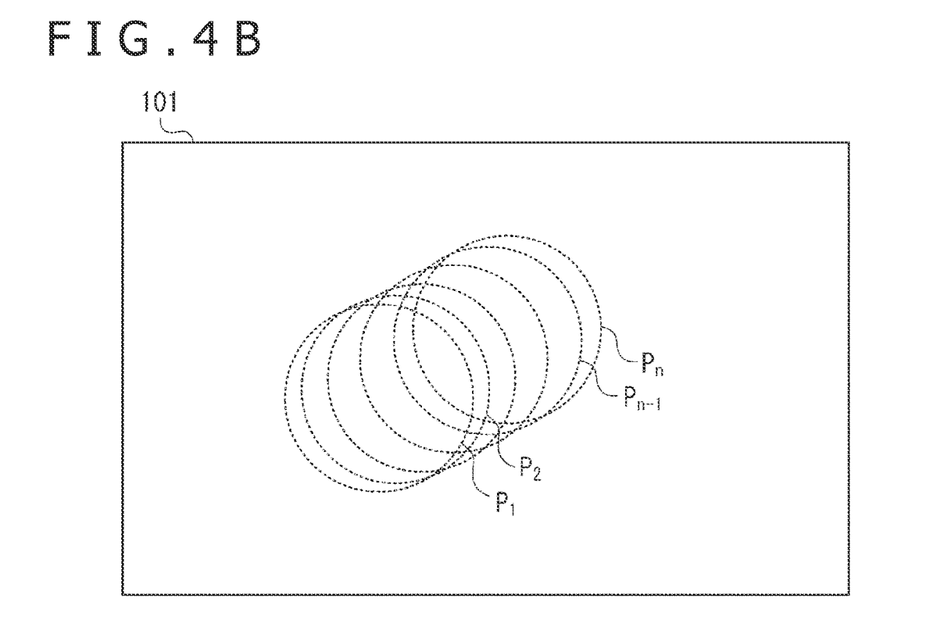
FIG. 4B is another view illustrating estimation of a movement and an inverse filter based on an event signal in the embodiment of the present invention.

FIGS. 4A to 4D are views illustrating estimation of a movement and an inverse filter based on an event signal in the embodiment of the present invention. In the examples depicted, an imaging target obj is captured in the RGB image 101. Since the imaging target obj moves during scanning by the image sensor 110, blurring occurs in the RGB image 101 and the picture of the imaging target obj is elongated as depicted in FIG. 4A. On the other hand, as depicted in FIG. 4B, the event signal 201 indicates that an event has occurred with a pixel group $P_1$ immediately after the start of scanning of the RGB image 101, and the pixel group $P_1$ gradually moves (pixel groups $P_2, \ldots, P_{n-1}$) until an event occurs with the pixel group $P_n$ immediately before the end of the scanning.

Figure 4C:
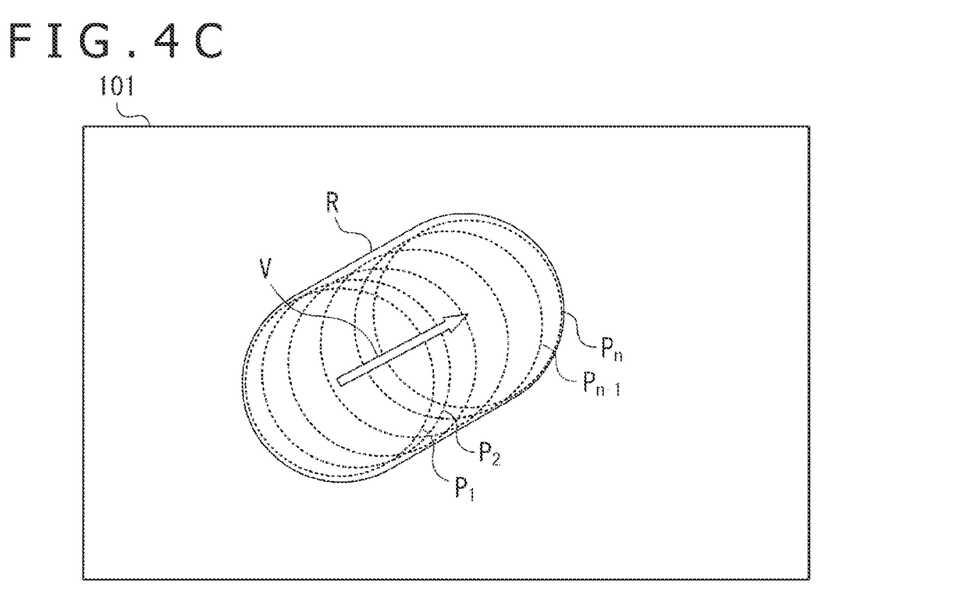
FIG. 4C is a further view illustrating estimation of a movement and an inverse filter based on an event signal in the embodiment of the present invention.

In this case, the movement estimation unit 310 estimates a movement region R and a movement vector V in the RGB image 101 as depicted in FIG. 4C. For example, the movement region R is a region that includes the pixel groups $P_1$, $P_2, \ldots, P_{n-1}, P_n$ at which events have occurred during a period of time from the start to the end of the scanning (the region corresponds to the picture of the imaging target obj elongated as a result of occurrence of blur), and the movement vector V is a vector for moving each pixel of the pixel group $P_1$ corresponding to the start point of the movement to each pixel of the pixel group $P_n$ corresponding to the end point of the movement. Since the sensor 210 for generating an event signal 201 is associated with one or a plurality of pixels of the RGB image 101 as described hereinabove, the movement estimation unit 310 need not refer to the RGB image 101 itself in order to estimate the movement region R and the movement vector V.

Figure 4D:
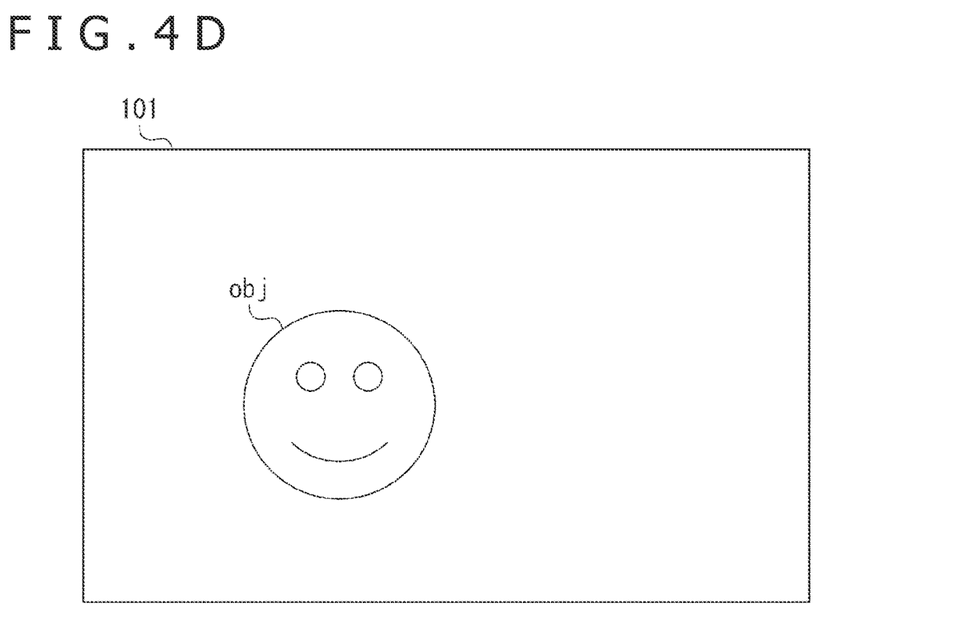
FIG. 4D is a still further view illustrating estimation of a movement and an inverse filter based on an event signal in the embodiment of the present invention.

In a case where such a movement region R and a movement vector V as described above are estimated, the inverse filter generation unit 320 applies them to the RGB image 101 to generate an inverse filter 321 from which such an output image 331 as depicted in FIG. 4D is to be obtained. In the example depicted, the inverse filter 321 acts in a limited way on pixels in the movement region R to cancel the movement vector V. In particular, the inverse filter 321 moves the pixels in the movement region R by a vector $-kV$ obtained by multiplying an inverse vector $-V$ of the movement vector V by a coefficient k. The coefficient k gradually increases such that, for example, it is 0 at the start point (pixel group $P_1$) of the movement vector V and becomes 1 at the end point (pixel group $P_n$). In the output image 331, the enlarged picture of the imaging target obj is compressed to its original size and the influence of the blur caused by the movement of the imaging target obj is reduced.

In such an embodiment of the present invention as described above, the movement estimation unit 310 of the image processing apparatus 300 estimates a movement of an imaging target in the RGB image 101 from the event signal 201. Since the event signal 201 is generated only in a case where an intensity change of light is detected at one or a plurality of pixels of the RGB image 101, the processing can be speeded up in comparison with that in an alternative case in which, for example, pixels of a plurality of RGB images 101 consecutive in time are compared with each other to estimate a movement. Further, since the inverse filter 321 generated by the inverse filter generation unit 320 acts in a limited way on the movement region R of the RGB image 101, occurrence of artifact can be suppressed, for example, in comparison with that in an alternative case in which a filter is applied to the overall RGB image 101 including a region other than the movement region R.

It is to be noted that the system 10 described in connection with the example described above may be incorporated in a single apparatus or may be distributed and implemented in a plurality of devices. For example, the RGB image 101 acquired by the RGB camera 100 and the event signal 201 acquired by the EDS 200 may be stored into a memory together with the timestamps 102 and 202, and as post processing, estimation of a movement by the image processing apparatus 300, generation of an inverse filter 321, and application of the inverse filter 321 may be executed. Alternatively, when the RGB image 101 and the event signal 201 are acquired, the processes up to the generation of an inverse filter 321 by the image processing apparatus 300 may be executed, and the inverse filter 321 may be stored together with the RGB image 101. In this case, when the RGB image 101 is displayed, the inverse filter 321 may be applied to the RGB image 101, for example, in accordance with an operation of a user to generate an output image 331.

Further, although, in the example depicted in FIG. 4D, an inverse filter 321 for compressing an elongated picture of an imaging target obj as a result of occurrence of blur to the start point side of the movement vector V is generated, in another example, an inverse filter 321 that compresses a picture of the imaging target obj to the end side or to an intermediate point of the movement vector V may be generated. Further, the inverse filter 321 to be generated on the basis of the event signal 201 is not limited to the example described above, and, for example, various filters each known as filter for reducing the influence of blur occurring by a movement of an imaging target can be used. Also in those cases, for example, if the movement estimation unit 310 estimates the movement region R of the system 10 and the inverse filter generation unit 320 generates an inverse filter 321 that acts in a limited way upon the movement region R, occurrence of artifact can be suppressed, for example, in comparison with that in an alternative case in which a filter is applied to the overall RGB image 101.

Figure 5:
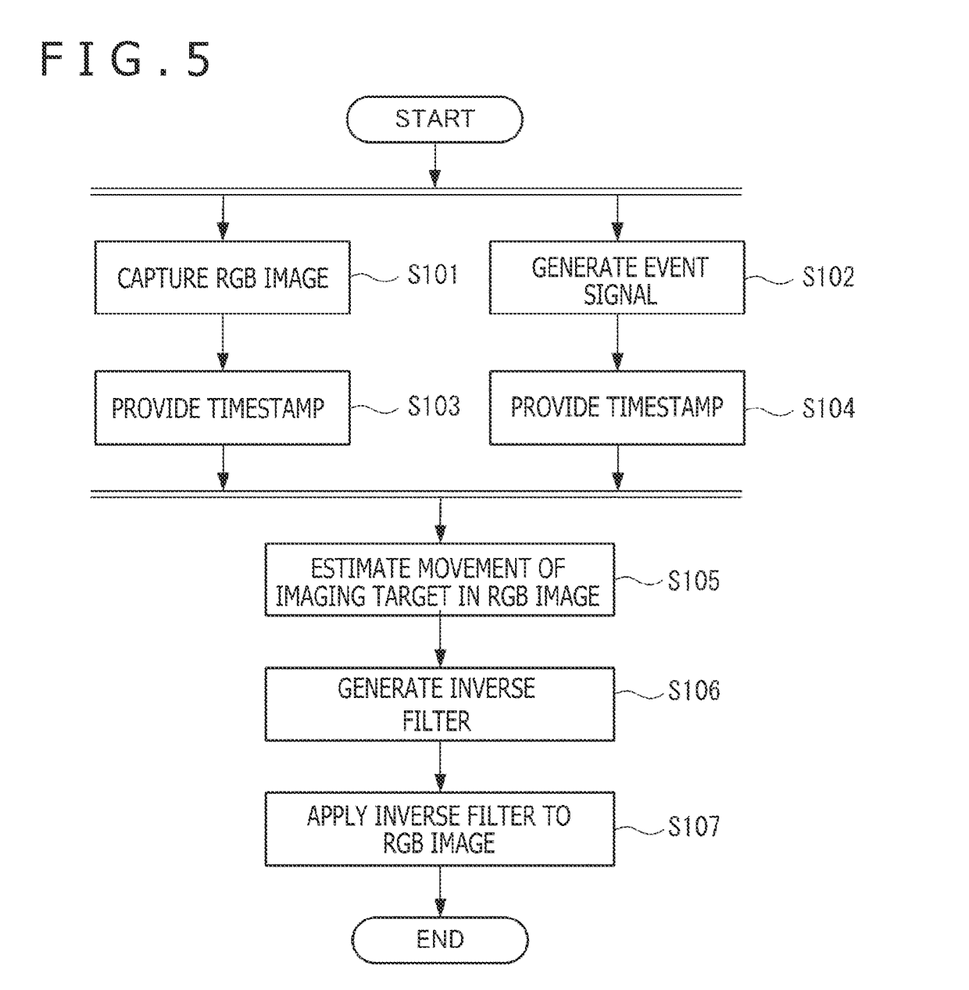
FIG. 5 is a flow chart depicting an example of an image processing method according to the embodiment of the present invention.

FIG. 5 is a flow chart depicting an example of an image processing method according to the embodiment of the present invention. In the example depicted, the RGB camera 100 captures an RGB image 101 (step S101), and the EDS 200 simultaneously generates an event signal 201 (step S102). It is to be noted that the step S102 at which the event signal 201 is generated is executed only in a case where the sensor 210 corresponding to one or a plurality of pixels of the RGB image 101 detects an intensity change of light. A timestamp 102 is provided to the RGB image 101 (step S103), and to the event signal, a timestamp 202 is provided (step S104).

Then, processing by the image processing apparatus 300 is executed. First, the movement estimation unit 310 estimates a movement of an imaging target in the RGB image 101 on the basis of the timestamp 102 of the RGB image 101, the event signal 201, and the timestamp 202 of the event signal 201 (step S105). Then, the inverse filter generation unit 320 generates an inverse filter 321 on the basis of the estimated movement (step S106), and the filter application unit 330 applies the inverse filter 321 to the RGB image 101 (step S107). By such processes as described above, for example, an output image 331 can be obtained in which the influence of blur appearing in the RGB image 101 by a movement of the imaging target is reduced.

Although an embodiment of the present invention has been described in detail with reference to the accompanying drawings, the present invention is not limited to such an embodiment. It is apparent that persons who have common knowledge in the technical field to which the present invention pertains could have conceived various alterations or modifications within the scope of the technical idea described in the claims, and it is construed that also they naturally fall within the technical scope of the present invention.

REFERENCE SIGNS LIST

10: System
100: RGB camera
101: RGB image
102: Timestamp
110: Image sensor
120: Processing circuit
201: Event signal
202: Timestamp
210: Sensor
220: Processing circuit
300: Image processing apparatus
310: Movement estimation unit
320: Inverse filter generation unit
321: Inverse filter
330: Filter application unit
331: Output image

The invention claimed is:

1. An image processing apparatus comprising:
a movement estimation unit that estimates, on a basis of a first timestamp provided to an image captured by synchronous scanning, an event signal generated corresponding to an intensity change of light at one or a plurality of pixels of the image, and a second timestamp that is provided to the event signal and is in synchronism with the first timestamp, a movement of an imaging target in the image;
an inverse filter generation unit that generates an inverse filter on a basis of the movement; and
a filter application unit that applies the inverse filter to the image.

2. The image processing apparatus according to claim 1, wherein
the first timestamp includes a timestamp indicative of at least any of start or end of the scanning, and
the movement estimation unit estimates a movement of the imaging target in the image on a basis of the event signal having the second timestamp included in a period of time from the start to the end of the scanning.

3. The image processing apparatus according to claim 1, wherein:
the movement estimation unit estimates a movement region in which a movement of the imaging target has occurred in the image, and
the inverse filter generation unit generates the inverse filter that acts in a limited way on the movement region.

4. The image processing apparatus according to claim 1, wherein:
the movement estimation unit estimates a movement vector indicative of a movement of the imaging target in the image, and
the inverse filter generation unit generates the inverse filter that cancels the movement vector.

5. The imaging processing apparatus of claim 1, further comprising:
a first vision sensor that captures the image by synchronous scanning and provides the first timestamp to the image; and
a second vision sensor that includes a sensor associated with the one or a plurality of pixels of the image, and that generates, when the second vision sensor detects the intensity change of light, the event signal, and provides the second timestamp synchronized with the first timestamp to the event signal.

6. A system comprising:
a first vision sensor that captures an image by synchronous scanning and provides a first timestamp to the image;
a second vision sensor that includes a sensor associated with one or a plurality of pixels of the image, generates, when the sensor detects an intensity change of light, an event signal, and provides a second timestamp synchronized with the first timestamp to the event signal; and
an image processing apparatus that includes
a movement estimation unit that estimates a movement of an imaging target in the image on a basis of the first timestamp, the event signal, and the second timestamp,
an inverse filter generation unit that generates an inverse filter on a basis of the movement, and
a filter application unit that applies the inverse filter to the image.

7. An image processing method comprising:
capturing an image by synchronous scanning and providing a first timestamp to the image;
including a sensor associated with one or a plurality of pixels of the image, generating, when the sensor detects an intensity change of light, an event signal, and providing a second timestamp synchronized with the first timestamp to the event signal;
estimating a movement of an imaging target in the image on a basis of the first timestamp, the event signal, and the second timestamp;
generating an inverse filter on a basis of the movement; and
applying the inverse filter to the image.

8. A non-transitory, computer readable storage medium containing a program, which when executed by a computer, causes the computer to perform an image processing method by carrying out actions, comprising:
estimating, on a basis of a first timestamp provided to an image captured by synchronous scanning, an event signal generated corresponding to an intensity change of light at one or a plurality of pixels of the image, and a second timestamp that is provided to the event signal and is in synchronism with the first timestamp, a movement of an imaging target in the image;

generating an inverse filter on a basis of the movement; and applying the inverse filter to the image.

* * * * *